May 8, 1934.  C. L. KENNEDY  1,957,715
LUBRICATING CUP
Filed Aug. 15, 1933
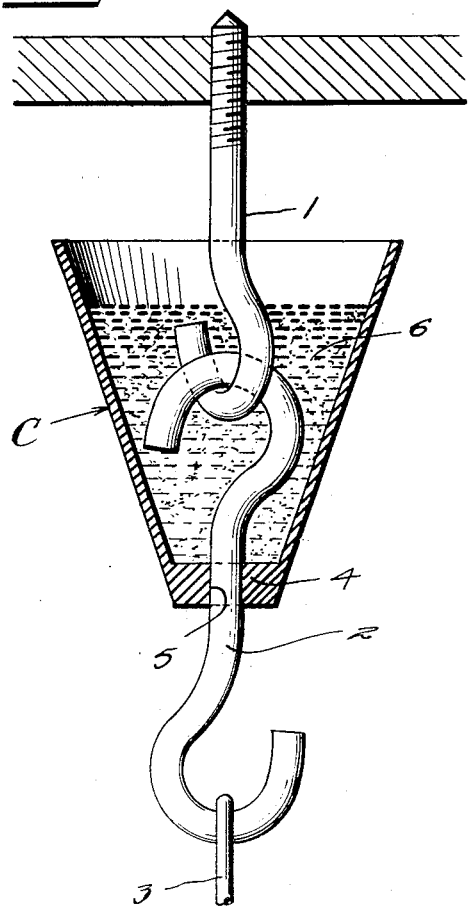
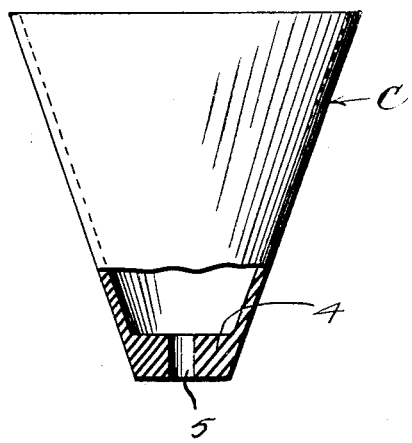
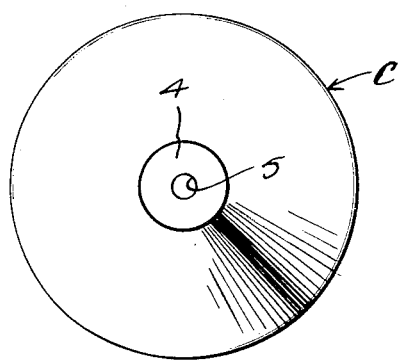
INVENTOR.
C. L. Kennedy
BY
Watson E. Coleman
ATTORNEYS.

Patented May 8, 1934

1,957,715

UNITED STATES PATENT OFFICE 1,957,715

LUBRICATING CUP

Charles L. Kennedy, Butler, Pa.

Application August 15, 1933, Serial No. 685,255

1 Claim. (Cl. 248—64)

This invention relates to a lubricating cup, and it is an object of the invention to provide a cup of this kind especially designed and adapted for use in connection with a hanger for a swing or kindred device.

It is also an object of the invention to provide a device of this character formed of a rubber compound or kindred material and which is so constructed as to allow the same to be mounted upon a hook member in a manner to effectively assure lubrication of such hook member with respect to the suspending member with which it may be engaged and whereby the cup may be easily adjusted lengthwise of the hook member as the requirements of practice may necessitate.

The invention consists in the details of construction and in the combination and arrangement of the several parts of my improved lubricating cup whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view partly in section and partly in elevation illustrating a lubricating cup constructed in accordance with an embodiment of my invention and in applied position;

Figure 2 is a view partly in elevation and partly in section of my improved cup as herein disclosed unapplied;

Figure 3 is a view in bottom plan of the cup as illustrated in Figure 1.

As illustrated in the accompanying drawing, 1 denotes a suspending device herein disclosed in the form of a screw hook and engaging this suspending device in a conventional manner is a hook member 2 with which is also engaged a hanger chain 3 or the like for a swing. My improved lubricating cup C as herein disclosed is substantially in the form of an inverted cone with its larger end fully open and its smaller or apex end portion closed by a bottom wall 4 of a material thickness and also of a thickness in excess of the thickness of the peripheral wall of the cup. The walls of the cup C are produced from a rubber compound or kindred material and disposed through the axial center of the bottom wall 4 is an opening 5. Normally this opening 5 is of a diameter slightly less than the diameter of the hook member 2 so that when this member 2 is threaded through the opening 5 the resultant deformation of the bottom wall 4 will assure close frictional contact with the member 2 so that the cup C will be effectively supported in desired adjusted position upon the member 2.

The cup C is of such dimensions to house or enclose the interfitting or locking portions of the suspending device 1 and the hook member 2 so that the lubricant 6, such as cut grease, within the cup C will assure effective lubrication of the coacting portions of the device 1 and member 2.

It is also to be stated that the cup C as required may be readily slid along the member 2 so that the cup C may be positioned at will in desired placement upon the member 2.

From the foregoing description it is thought to be obvious that a lubricating cup constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

As a new article of manufacture, a lubricant cup for a hanging member having a side wall and a bottom wall, said walls being integral and of deformable material, said cup being substantially in the form of an inverted cone with its larger end open, the bottom wall at the smaller end of the cup being of a thickness materially greater than the thickness of the side wall, said bottom wall having an opening through which the hanger member is adapted to be threaded, said opening being normally of a diameter less than the diameter of a portion of the hanger member to assure close frictional contact of the bottom of the cup with said portion of the hanger member.

CHARLES L. KENNEDY